United States Patent
Chapman et al.

(10) Patent No.: US 7,304,815 B2
(45) Date of Patent: Dec. 4, 2007

(54) LASER SYSTEM

(75) Inventors: Mark Adrian Vincent Chapman, Wotton-under-Edge (GB); William Ernest Lee, Bristol (GB); Tingdi Liao, Paignton (GB)

(73) Assignee: Renishaw, PLC, Gloucestershire (GB)

( * ) Notice: Subject to any disclaimer, the term of this patent is extended or adjusted under 35 U.S.C. 154(b) by 272 days.

(21) Appl. No.: 10/528,662

(22) PCT Filed: Oct. 3, 2003

(86) PCT No.: PCT/GB03/04360

§ 371 (c)(1),
(2), (4) Date: Mar. 22, 2005

(87) PCT Pub. No.: WO2004/031816

PCT Pub. Date: Apr. 15, 2004

(65) Prior Publication Data

US 2006/0019372 A1    Jan. 26, 2006

(30) Foreign Application Priority Data

Oct. 4, 2002    (GB) .............................. 0222962.3

(51) Int. Cl.
*G02B 5/04* (2006.01)
*G01B 9/02* (2006.01)

(52) U.S. Cl. ..................... 359/837; 356/450
(58) Field of Classification Search ................ 356/450, 356/510; 359/211, 837
See application file for complete search history.

(56) References Cited

U.S. PATENT DOCUMENTS

| 2,841,062 | A | * | 7/1958 | O'Brien ...................... 396/554 |
| 3,170,982 | A | * | 2/1965 | Hemstreet et al. .......... 356/510 |
| 3,378,687 | A | * | 4/1968 | Schepler .................. 250/203.4 |
| 4,168,126 | A | * | 9/1979 | Altman et al. .............. 356/640 |
| 4,850,686 | A | * | 7/1989 | Morimoto et al. .......... 359/196 |
| 5,280,387 | A | * | 1/1994 | Maruyama .................. 359/554 |
| 5,535,041 | A | * | 7/1996 | Ayral et al. ................. 359/211 |
| 5,701,198 | A | * | 12/1997 | Schoppe ..................... 359/386 |
| 6,163,379 | A |  | 12/2000 | de Groot |
| 6,473,250 | B1 | * | 10/2002 | Chapman et al. ........... 359/837 |
| 6,952,266 | B2 | * | 10/2005 | Abbink ....................... 356/451 |

FOREIGN PATENT DOCUMENTS

| EP | 0 631 156 A2 | 12/1994 |
| WO | WO 99/38045 A1 | 7/1999 |
| WO | WO 00/57228 A2 | 9/2000 |

* cited by examiner

*Primary Examiner*—Gregory J. Toatley, Jr.
*Assistant Examiner*—Scott M Richey
(74) *Attorney, Agent, or Firm*—Oliff & Berridge, PLC

(57) ABSTRACT

A laser system and interferometer are disclosed comprising a laser source for generating a laser beam, and first and second adjustable elements wherein the first and second adjustable elements have limited rotational motion so rotation of the first adjustable element causes deviation of a laser beam in one plane and rotation of the second adjustable element causes deviation in a second plane, and a laser beam from the laser source is oblique to a required beam direction whereby rotation of the adjustable elements deviates the laser beam enabling alignment of the laser beam to the required beam direction. The adjustable elements may be rotatable through 90°. The first and second planes may be perpendicular to the required beam direction and to each other. At least one mirror may be provided which can be angularly offset to the required beam direction.

13 Claims, 2 Drawing Sheets

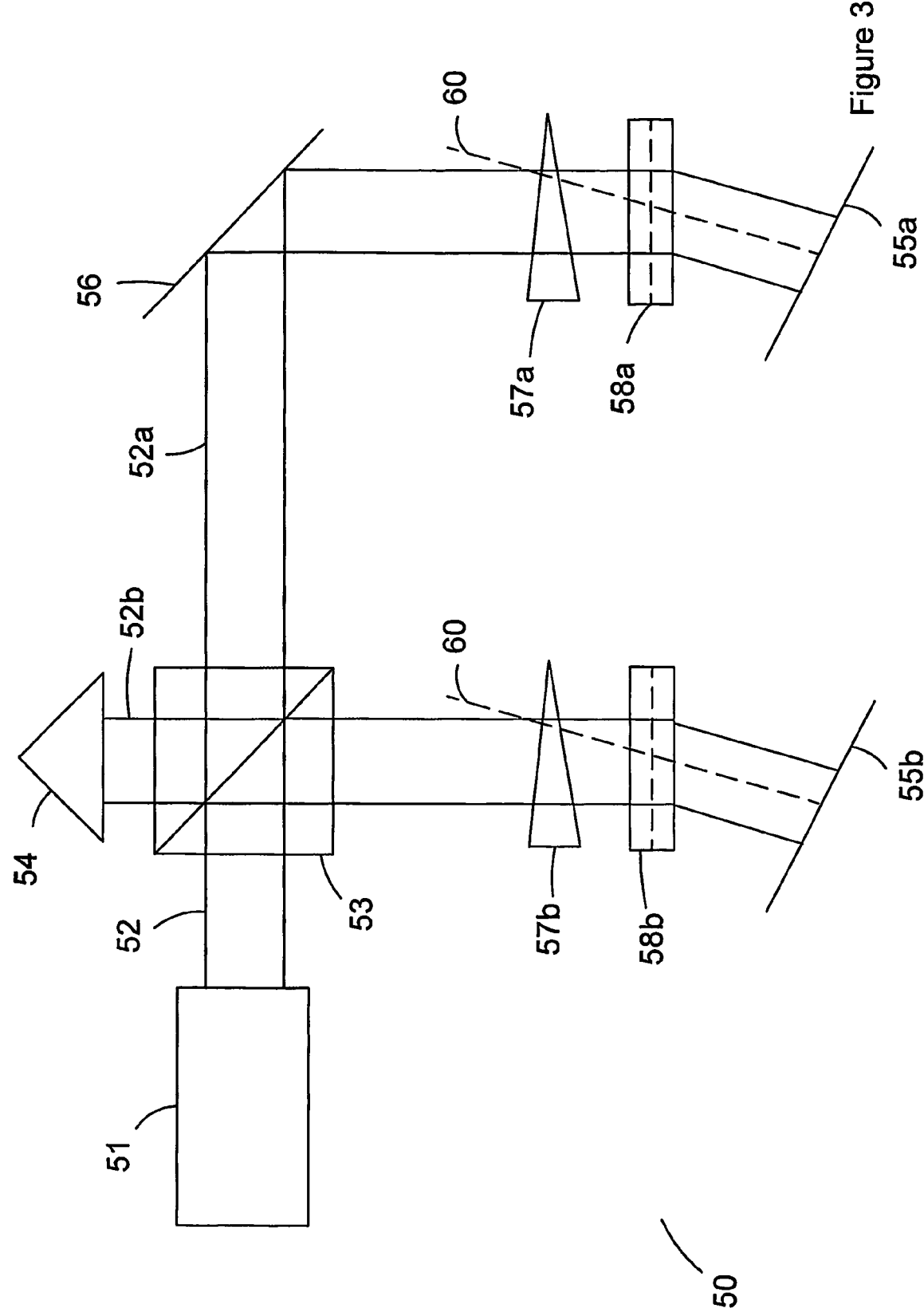

LASER SYSTEM

This invention relates to a laser system and in particular the alignment of a laser beam in a laser system.

It is known to control the orientation of a laser beam using two or more rotating prisms. Depending on the number of rotating prisms and their relative orientations one-dimensional or two-dimensional alignment of a laser beam can be achieved. Rotation of one prism deviates the beam direction in one plane. A second rotating prism can increase the degree of deviation within this plane or, it can deviate the beam direction in a different plane however the combined effect of the two prisms on the location of the beam is not obvious. Problems that occur with known methods of controlling the orientation of a laser beam include the fact that the prisms can be expensive as in order to achieve the objective they often have to be matched pairs of prisms. Adjustment of the prisms can be time consuming and unintuitive. The amount of adjustment of the beam direction in a given plane may also be limited.

According to a first aspect of the present invention there is provided a laser system comprising:
 a laser source for providing a laser beam along a beam path; and
 first and second adjustable elements which lie in the beam path; characterised in that,
 the first and second adjustable elements each have limited rotational motion such that rotation of the first adjustable element causes deviation of a laser beam in one plane and rotation of the second adjustable element causes deviation in a second plane, and
 a laser beam from the laser source is oblique to a required beam direction whereby rotation of the adjustable elements deviates the laser beam enabling alignment of the laser beam to the required beam direction.

Preferably, the first and second planes are perpendicular to the required beam direction.

Preferably, the laser system further comprises at least one mirror positioned in the beam path. The at least one mirror is preferably at an angle offset to the required beam direction wherein a combination of deviation by the first and second adjustable elements and reflection by the mirror enables alignment of the laser beam to the required beam direction.

According to a second aspect of the present invention there is provided a laser interferometer comprising:
 a laser source for providing a first laser beam along a beam path;
 means to provide a second laser beam;
 interference means for providing an interference beam from a supposition of the first and second laser beams;
 a detector for detecting the interference beam; and
 first and second adjustable elements which lie in the beam path; characterised in that,
 the first and second adjustable elements each have limited rotational motion such that rotation of the first adjustable element causes deviation of a laser beam in one plane and rotation of the second adjustable element causes deviation in a second plane, and
 a laser beam from the laser source is oblique to a required beam direction whereby rotation of the adjustable elements deviates the laser beam enabling alignment of the laser beam to the required beam direction.

Preferably the laser interferometer system further comprises a mirror in the path of the first laser beam. The mirror is preferably at an angle offset to the required beam direction wherein a combination of deviation by the first and second adjustable elements and reflection by the mirror enables alignment of the laser beam to the required beam direction.

The invention will now be described by way of example and with reference to the accompanying drawings of which:

FIG. 3 shows a laser interferometer system according to the invention.

Figure 1:
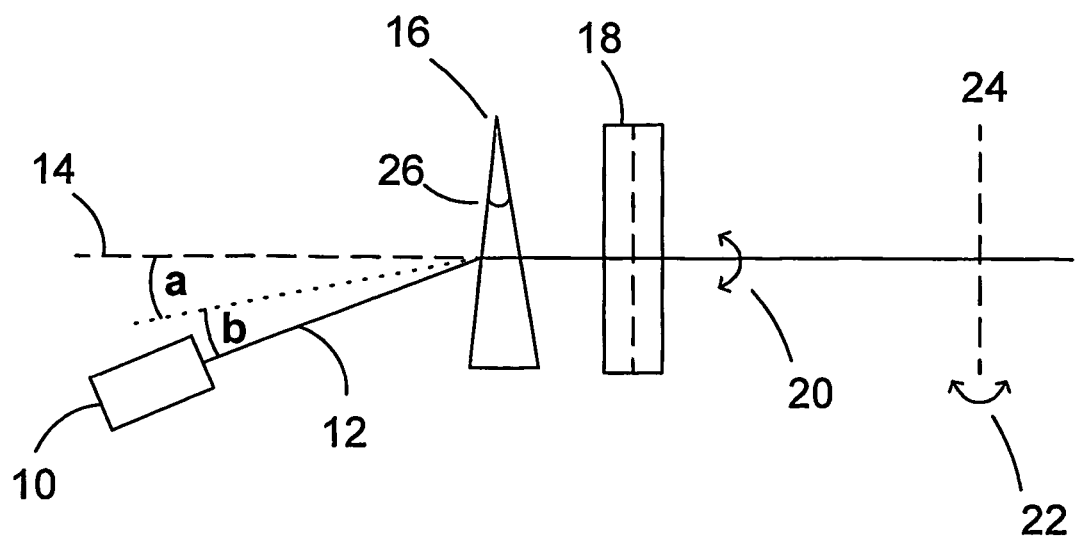
FIG. 1 shows a plan view of a laser system according to the invention.

FIG. 1 shows a laser system having a laser source 10 which provides a laser beam 12 at an angle which is substantially non-parallel (or oblique) to the required beam direction 14. This angle is called the design angle. The laser beam 12 is offset to the required beam direction 14 in two directions—in the z direction by an angle a and in the y direction by an angle b. Lying within the beam path is a first prism 16 and a second prism 18 both of which are rotatable 20 about the beam path.

Alternatively, the two prisms may be oscillated 22 about a plane 24 perpendicular to the required beam direction in order to cause deviation of the beam. This tilting of the prisms provides reduced angular flexibility of beam deviation compared with rotation 20 about the beam path.

In this example, the prisms are orientated nominally or substantially at 90° to each other and are each rotatable through 90° hence, motion of one prism deviates the beam in a first plane and motion of the other prism deviates the beam in a plane at about 90° to the first plane. The restriction of the rotation enables simplified manipulation of the prisms in order to orient the laser beam onto the required beam direction.

The laser beam 12 from the laser source 10 is incident on the first prism 16 which is rotatable about 20 the beam path. Rotation of prism 16 causes deviation of laser beam 12 in the z direction thus rotation of prism 16 can change the deviation angle a of laser beam 12 in the z direction compared to that of the required beam direction 14. Rotation of the second prism 18 about the beam path 20 deviates the laser beam with respect to the y direction, i.e. rotation of this second prism 18 can deviate the laser beam 12 such that the angle b of deviation from the required beam path 14 is changed, thus by appropriate rotation of the first 16 and second 18 prisms, the deviation angles a and b are reduced to substantially zero and the laser beam, after passage through the two prisms, lies parallel to the required beam path 14.

The prisms may be rotated via manual or computer control.

The angle subtended by the laser beam source from the required beam direction (the design angle) is determined by the wedge angles 26 of the prisms. The greater the wedge angle of a prism, the larger the deviation of the laser beam from the required beam direction when it passes through the prism.

For convenience, the system is designed such that the design angle corresponds to the approximate centre of the restricted movement of both prisms enabling ±45° rotation of a prism about the design angle. There are a number of benefits to this. Firstly, some inaccuracy in laser positioning is tolerated. Secondly, rotations of the prisms will tend to lie at the centre of a 90° arc so relatively small adjustments will result in near linear beam deviations. Thirdly, the restriction to 90° rotation simplifies any beam adjustment as it is essentially confined to one quadrant of a circle for each prism.

The limited rotational motion of the prisms may be considerably less than 90° and it is preferred that it is up to about 90°. The amount of rotation, and therefore beam deviation, required for a particular system depends upon the tolerance with which the respective parts are initially aligned, the wedge angle of the prisms and relative angular misalignments between parts that occur over time amongst other things.

The skilled man will appreciate that alternative adjustable elements can replace the ones hereinbefore described. Examples include diffraction gratings, diffractive optical elements and holograms.

Figure 2:
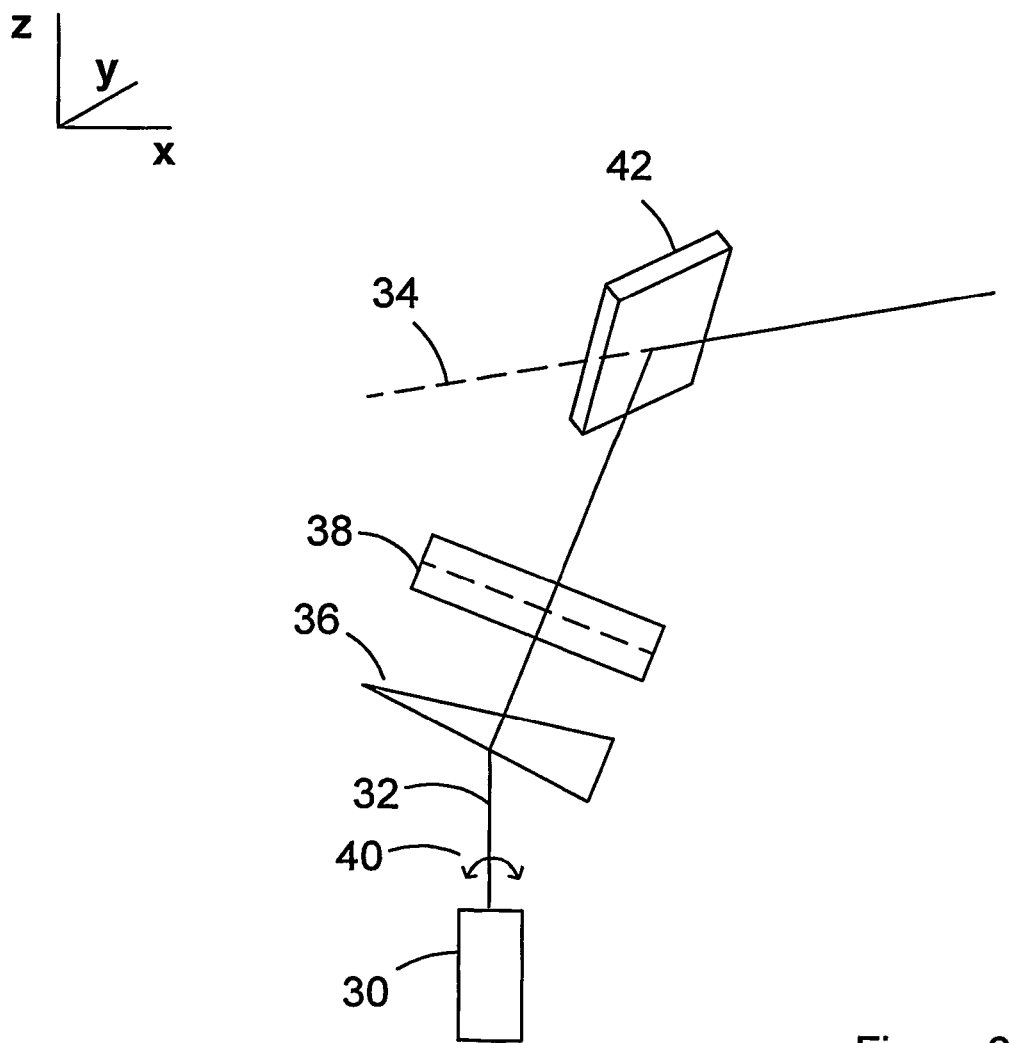
FIG. 2 shows schematically an alternative laser system according to the invention.

FIG. 2 shows schematically an alternate laser system according to the invention having a laser source 30 which provides a laser beam 32 which is initially oblique to the required beam path 34.

In order to deviate the laser beam 32 by almost 90°, a mirror 42 is provided in addition to first 36 and second 38 prisms. The mirror 42 is angularly offset to the required beam direction 34 so that when a laser beam is reflected off the mirror, the laser beam is deviated in two planes i.e. the mirror is tilted or non-perpendicular with respect to the x, y and z axes. The positions of the mirror 42 and the laser source 30 are fixed with respect to the required beam direction 34 at approximately the right orientation to cause deflection of a laser beam from the source to the required beam direction. The two prisms 36,38 which are rotatable 40 to deviate the laser beam 32 in two planes are used to fine-tune the effect of the mirror 42.

A mirror is traditionally used in laser systems to provide orthogonal deflection of the laser beam. However, it is difficult to angularly align a mirror accurately. This embodiment of the invention allows for near orthogonal deflection whilst allowing small deviations from true alignment during assembly of a laser system to be accommodated and adjusted for.

In a conventional laser system, the mirror is aligned using a micrometer, screw thread or differential screw. These adjusters remain in the laser system which increases the sensitivity of the system to temperature fluctuations as the adjusters are made from a material (steel) which has a different thermal expansion coefficient to the mirror material. Due to the design of the adjusters, a linear expansion of the adjuster results in a rotational movement of the mirror, which, if large enough will result in misalignment.

In the present invention, the mirror is fixed in position with respect to the laser source at about the correct angular orientation and the two prisms are used to adjust the direction of the laser beam which is incident on the mirror. The prisms of the present invention may be mounted within an aluminium ring which locates the prisms and enables adjustment thereof. Although temperature fluctuations will still cause expansion of the rings, as the prism is within the ring, such expansion will stretch the prism linearly not rotationally. Thus a laser system according to the invention is less sensitive to changes in temperature.

In an alternative arrangement, the first and second beam steering prisms can be located after the mirror so the laser beam path is fine-tuned after reflection.

Although in this example, the laser beam is almost orthogonal to the required beam direction, the person skilled in the art will appreciate that any oblique deviation is possible with this embodiment of the invention by appropriate orientation of the respective parts of the laser system or the addition of more mirrors, for example.

FIG. 3 shows an interferometer system 50 having a combined laser source and detector 51 which produces a laser beam 52. A beam splitter 53 splits the laser beam into two sub-beams 52*a* and 52*b* which are subsequently directed to individual mirrors 55*a*,55*b* respectively. One of the mirrors 55*a* is secured to an object (not shown) which is relatively fixed with respect to the beamsplitter 53, the other mirror 55*b* is secured to a relatively movable object (not shown). In the example shown, the mirrors are approximately parallel to each other and lie on the optical axis 60 of the interferometer (the required beam direction is thus parallel to this axis). This optical axis is oblique with respect to the laser source 51. The mirrors 55*a*,55*b* reflect the laser sub-beams 52*a*,52*b* which are subsequently recombined at the beam splitter 53 producing an interference beam which is detected by the combined laser source and detector 51. This interference beam gives information about the relative positions of the two objects (not shown).

In order to produce the two spaced apart sub-beams characteristic of a column interferometer one of the sub-beams 52*b* is directed to a retroreflector 54 located adjacent the beam splitter whereas the other sub-beam 52*a* is directed to a mirror 56 placed away from the beam splitter 53 at approximately 45° to the laser sub-beam path, the mirror 56 and retroreflector 54 each direct a respective sub-beam towards the individual mirrors 55*a* and 55*b*. In the path of each sub-beam, between mirror 56 or retroreflector 54 and individual mirrors 55*a*,55*b* are two sets of two rotatable prisms 57*a*,58*a* and 57*b*,58*b* one set of prisms lying in the path of each sub-beam 52*a*,52*b* respectively. These prisms are each rotatable about the axis of the sub-beams through 90° and are be disposed such that rotation of one prism 57*a*,57*b* causes deviation of the respective sub-beam 52*a*, 52*b* out of the plane of the paper whereas rotation of the other prism 58*a*,58*b* causes deviation of the sub-beam in the plane of the paper. It is preferred that the pairs of prisms 57,58 are arranged so that the beam deviations resulting from rotation of each prism are substantially orthogonal over a small angular range. This allows control of the direction of each sub-beam 52*a*,52*b* in two directions (which are not necessarily orthogonal), independently of the other sub-beam.

The use of adjustable elements increases the tolerance of the system to misalignments of optical components within the system.

The interferometer system shown in FIG. 3 could be adapted for use with the embodiment of the invention which uses an angularly offset mirror in addition to the two rotatable prisms in order to achieve larger laser beam deviations for one or both of the sub-beams. Depending on the requirements, the angular alignment of the sub-beams could comprise completely separate systems (as shown in FIG. 3) or one or more parts could be shared by the sub-beams.

The two prisms described herein could be replaced by known configurations of one or more prisms depending on requirements as to number of dimensions or deviation required and the important of limiting chromatic aberrations.

It is preferred that when two prisms are used, that the prisms are non-matched prisms. One reason for this is to reduce cost.

The invention claimed is:

1. A laser system comprising
 a laser source for generating a laser beam along a path; and
 first and second adjustable elements which lie in the beam path;
 wherein the first and second adjustable elements each have limited rotational motion such that rotation of the first adjustable element causes deviation of the laser beam in a first plane and rotation of the second adjustable element causes deviation of the laser beam in a second plane, wherein the first and second adjustable elements are non-matched adjustable optical elements that each have limited rotational motion about the beam path, and wherein the laser beam from the laser source is always oblique to a required beam direction whereby rotation of the first and second adjustable elements deviates the laser beam enabling alignment of the laser beam to the required beam direction.

2. A laser system according to claim 1 wherein, the first and second adjustable elements comprise non-matched prisms.

3. A laser system according to claim 1 wherein, the first and second planes are perpendicular to the required beam direction.

4. A laser system according to claim 1 wherein, the first and second planes are perpendicular to each other.

5. A laser system according to claim 1 wherein, the first and second adjustable elements are each rotatable through 90°.

6. A laser system according to claim 1 further comprising at least one mirror provided in the beam path.

7. A laser system according to claim 6 wherein the mirror is angularly offset to the required beam direction.

8. A laser system according to claim 1 wherein the first and second adjustable elements are each rotatable through an angle of up to 90°.

9. A laser interferometer comprising
a laser source for providing a first laser beam along a first beam path;
means to provide a second laser beam;
interference means for providing an interference beam from a superposition of the first and second laser beams;
a detector for detecting the interference beam; and
first and second adjustable elements which lie in the beam path;
wherein the first and second adjustable elements each have limited rotational motion such that rotation of the first adjustable element causes deviation of the first laser beam in a first plane and rotation of the second adjustable element causes deviation of the first laser beam in a second plane,
wherein the first and second adjustable elements are non-matched adjustable optical elements that each have limited rotational motion about the first beam path, and
wherein the first laser beam from the laser source is always oblique to a required beam direction whereby rotation of the first and second adjustable elements deviates the first laser beam enabling alignment of the first laser beam to the required beam direction.

10. A laser interferometer according to claim 9 further comprising at least one mirror provided in the beam path.

11. A laser interferometer according to claim 10 wherein the mirror is angularly offset to the required beam direction.

12. A laser interferometer according to claim 9 wherein the first and second adjustable elements comprise non-matched prisms.

13. A laser interferometer according to claim 9 wherein the first and second adjustable elements are each rotatable through an angle of up to 90°.

* * * * *